March 22, 1960  C. W. SKELTON  2,929,991
TIME COMPARISON SYSTEM

Filed April 24, 1957  2 Sheets-Sheet 1

INVENTOR
Charles W. Skelton
BY
Stevens, Davis, Miller & Mosher
ATTORNEYS

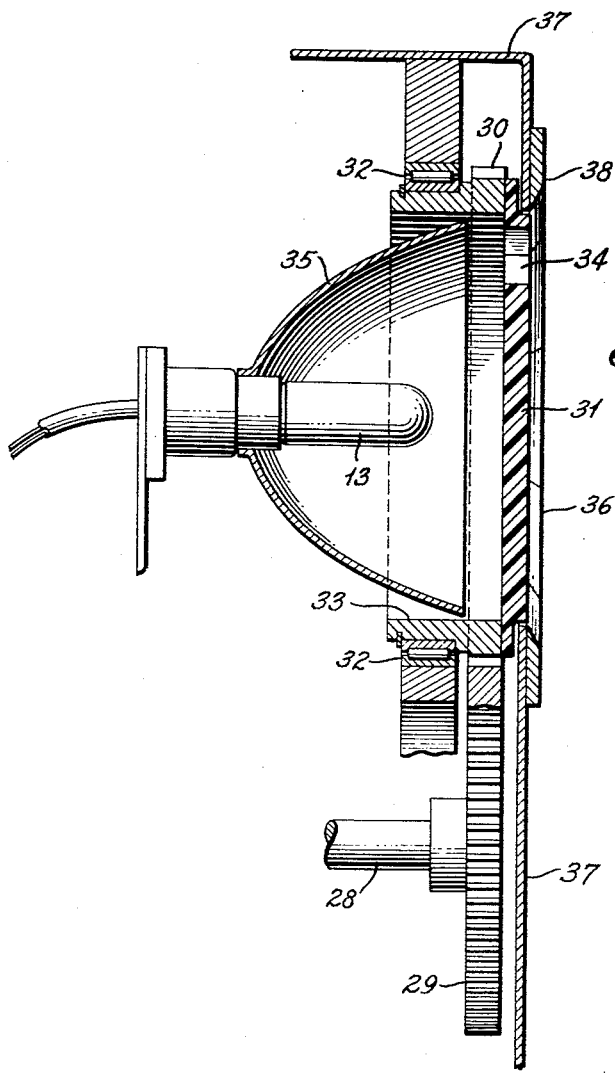

United States Patent Office 2,929,991
Patented Mar. 22, 1960

2,929,991

TIME COMPARISON SYSTEM

Charles W. Skelton, Irving, Tex., assignor to Texas Instruments Incorporated, Dallas, Tex., a corporation of Delaware Application April 24, 1957, Serial No. 654,951

9 Claims. (Cl. 324—68)

This invention relates to an apparatus for comparing a locally produced time indication with a radio transmitted standard with means to correct the locally produced indication until it corresponds with the standard.

A radio time standard is continuously transmitted by sending a time tick or signal once every second. By detecting this signal and using it to drive a clock mechanism or the like, remotely located stations and stations on moving vehicles can keep track of the exact time in accordance with the transmitted standard. However, because of interference and other causes, a station may not be able to receive the time tick over varying intervals lasting several days.

During this time it is necessary for such stations to rely on locally generated time signals. When the standard signal is again received, it is necessary to correct the locally generated indication to correspond with the standard. The apparatus according to the present invention provides a system for quickly and accurately observing the error between the locally generated indication and the standard and then by a simple turn of the knob, the local indication can be corrected to precisely correspond with the standard. This observation and correction can be easily carried out for errors as small as 10 milliseconds.

Briefly described, the locally generated indication comprises a 60 cycle per second source which is used to drive an opaque disk at a rate of one revolution per second. The opaque disk has defined therein an arrow shaped aperture. The radio time tick is detected and controls the energization once every second of a strobe light which illuminates the arrow shaped aperture. The displacement of the arrow shaped aperture from a norm at the time of illumination gives a precise and easily perceived indication of the error between the standard and the local time. A control means is provided to delay or advance the phase of the 60 cycle signal. By a simple adjustment of this control means, the point of illumination of the arrow shaped aperture can be made to coincide with the norm and when this adjustment is made, the local indication will correspond exactly to the radio standard.

The objects and advantages can be better appreciated from the description with reference to the drawings wherein:

Figure 4 shows a section through the center of Figure 2.

The standard time signal used in this invention is modulated on a radio frequency which is continuously transmitted. It consists of a thousand cycle pulse of 0.005 second or 5 cycles in length. This pulse is repeated at a rate of once every second. In the intervals between the pulses, the radio frequency is modulated with 440 or 600 cycles per second.

Figure 1:
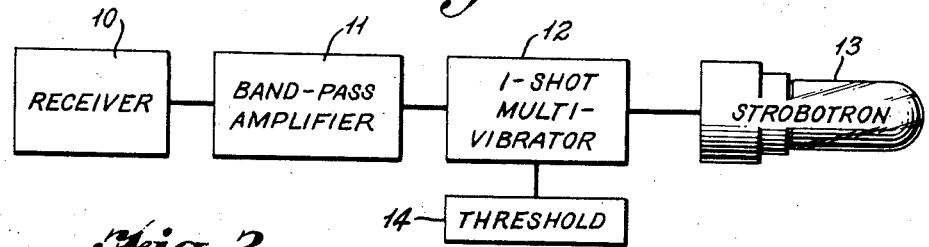
Figure 1 shows a block diagram of the time tick detecting part of the system.

Referring now to Figure 1, the system for detecting this time signal is shown. The receiver 10 detects the radio signal and demodulates it and applies the resulting signal to the band pass amplifier 11. The demodulated signal applied to the band pass amplifier consists of thousand cycle pulses coming at intervals of once every second while a frequency of 440 or 600 cycles is applied to the band pass amplifier between the pulses. The band pass amplifier 11 transmits only signals having a frequency between the range of 900 and 1100 cycles per second. The amplified output from the amplifier 11 is applied to the one shot multivibrator 12. The only signal applied to the multivibrator is the 1000 cycle pulses coming once every second. The one shot multivibrator is actuated to produce a D.C. output pulse each time it receives one of these pulses. Along with the 1000 cycle pulses applied to the multivibrator there will also be some noise. Most of this noise will be of insufficient amplitude to actuate the multivibrator. The amplitude necessary to cause actuation can be varied by means of the threshold control 14, which is adjusted so that all signals just below the amplitude of the 1000 cycle pulses being received from the amplifier 11 will not have enough amplitude to actuate the multivibrator. In this manner, the optimum amount of noise is made ineffective. The one shot multivibrator 12 applies its D.C. output pulses to the strobotron 13. Upon receiving each pulse, the strobotron is energized and produces a brief illumination. Hence, the strobotron 13 will give off a brief pulse of light once every second at the same time that the receiver 10 detects the 1000 cycle time tick.

Figure 3:
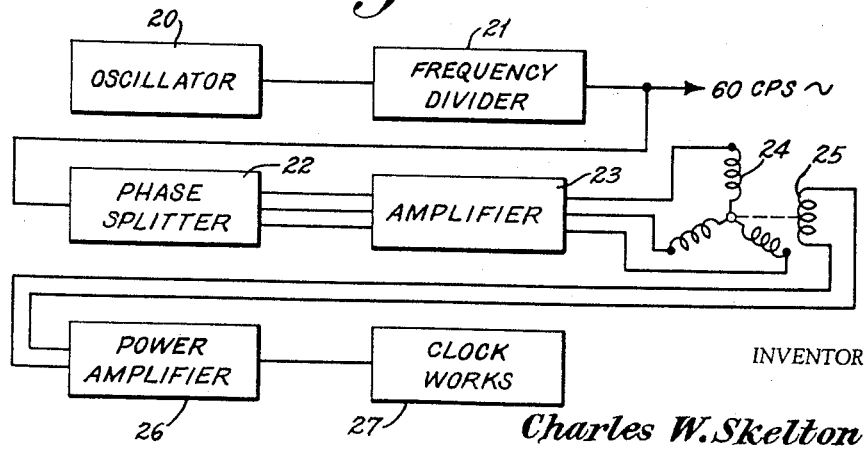
Figure 3 shows a block diagram of the system for generating the local indication.

Figure 3 shows a block diagram of the system for generating the local indication of time. An oscillator 20 is designed to produce an output frequency of 122.88 kilocycles per second. The oscillator employs a GT cut crystal so that this frequency is very accurately maintained. The frequency output of the oscillator is fed to a frequency divider 21 which divides the input frequency by two to the eleventh power. The frequency divider therefore produces an output of 60 cycles per second. This output is fed to a phase splitter 22 which produces at its output a three phase supply of 60 cycles per second. The output from the phase splitter is fed to an amplifier 20 and the amplifier applies the signal to the stator windings 24 of a self-synchronous repeater, each phase being applied to a separate one of the three windings. A single phase 60 cycle signal is picked up by the rotor winding 25 of the synchronous repeater and is applied to the power amplifier 26. This 60 cycle signal induced in the rotor winding is the local indication of time. After amplification, this signal is applied to and drives the clock works 27.

Referring now to Figure 4, the clock works 27 is used to drive a shaft 28 at a reduced r.p.m. The shaft 28 drives a gear 29. The gear 29 engages with the gear 30 mounted on the ring 33. The ring 33 is mounted in the bearing 32, which is supported by the casing 37. Inside the ring 33 is mounted a reflector 35 and supported within the reflector 35 is the strobotron 13 which produces a light pulse once every second as was explained in the description with reference to Figure 1. The reflector covering 35 directs the light pulses to illuminate one side of an opaque disk 31 which is fixed to the ring 33 so that it covers one end thereof. The gear 29 drives the gear 30 so that the opaque disk 31 makes one revolution per second as controlled by the locally generated 60 cycle signal. Covering the opaque disk 31 is a translucent screen 36 which is mounted on the casing 37.

Figure 2:
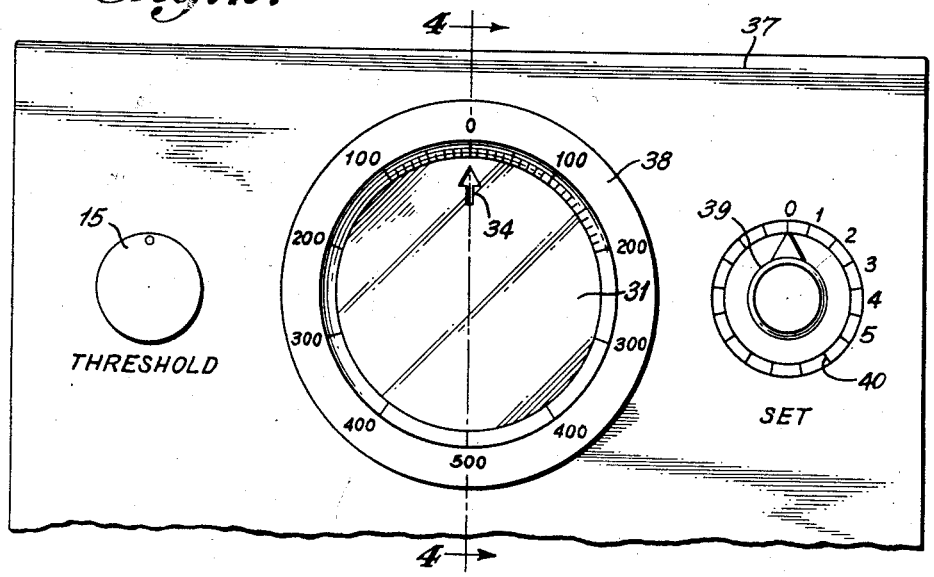
Figure 2 illustrates an external view of the apparatus showing the indicator and the control dials.

The front view of the apparatus can be seen in Figure 2. An arrow shaped aperture 34 is defined in the disk 31. This aperture permits the passage of light to the translucent screen causing an arrow shaped image to appear on the screen at the position of the aperture each time the strobotron is energized. Around the edges of the rotating disk 31 is a fixed indexing ring 38 which is divided into 100 equal divisions.

The indexing mark at the top of the ring is designated by the numeral 0. Every 10 marks going to the left and to the right are designated 100, 200, etc., down to the indexing mark at the bottom of the ring designated 500. These designation numerals on the indexing ring represent the difference between the local indication and the standard time tick in milliseconds, each division on the indexing ring being 10 milliseconds. The indexing mark at which the arrow image appears will represent the error between the two time signals.

In operation, the disk 31 will be making one revolution per second and the strobotron 13 which is mounted behind the opaque disk 31 will illuminate the arrow aperture 34 once every second. The disk 31 is driven by the 60 cycle local time indication while the illumination of the arrow shaped aperture is controlled by the radio standard time indication. As long as these two time indications are in synchronism, the arrow shaped aperture will appear at the same position which is arbitrarily set at the zero mark. However, when the local indication comprising the 60 cycle signal begins to differ from the standard radio received time indication, the point of illumination of the arrow will move off the zero mark to the right or to the left, depending upon whether the local indication is ahead of or behind the standard. The amount of deviation of the illuminated aperture will correspond to the amount of error between the two signals. If the local indication is one tenth of a second ahead of the radio standard, then the arrow shaped image will appear one tenth of the way around the indexing ring since the disk is making one revolution per second. The point of illumination then will be at the indexing mark designated 100 indicating an error of 100 milliseconds.

In order to correct the local indication with the radio standard, all that is necessary is to revolve the rotor 25, shown in Figure 3, of the self-synchronous repeater 24 in the proper direction thereby advancing or retarding the phase of the signal induced on the rotor until this signal corresponds with the radio standard. This change in phase of the signal will of course effect the rotation of the disk 31 and the rotor 25 need merely be rotated until the arrow image again coincides with the zero indexing point. One revolution of the rotor 25 will advance or retard the phase of the signal one whole cycle of the 60 cycle signal which will be one sixtieth of a second. This amounts to about 17 milliseconds (actually 16⅔ milliseconds) so that to advance or retard the arrow 34 17 milliseconds the rotor 25 will have to make approximately one complete revolution. The rotor 25 is rotated by turning the knob 39 mounted on the right side of the disk and indexing ring 38. The knob is encircled by an indexing ring 40 which is divided into seventeenths, each division representing a correction of approximately one millisecond.

The knob 15 mounted on the left side of the disk 31 controls the threshold 14, which was described with reference to Figure 1.

As long as the maximum error between the adjustments of the local signal is less than a half a second, the error between the standard frequency and the locally generated 60 cycle signal can be quickly and easily ascertained. If the maximum error between the two signals is over half a second, then this system will be inadequate since the operator will not know whether the device is delayed or advanced behind the signal norm. However, by using a temperature stabilized GT cut crystal oscillator, the maximum error per day is 10 milliseconds so that the interval between the time that the standard signal can be received can be almost as long as 50 days. As a practical matter, the standard signal can always be obtained in less time than this.

It is to be understood that the foregoing disclosure relates only to the preferred embodiment of this invention and that numerous modifications may be made therein without departing from the spirit and scope of the invention as set forth in the appended claims.

What is claimed is:

1. Means for comparing a first time signal with the standard radio time tick comprising a rotatable indicating member, means to rotate said member in synchronism with said first time signal only, and means to illuminate at least part of said member with pulses of light in synchronism with said standard radio time tick.

2. A time comparison device as recited in claim 1 wherein said indicating member comprises a disk having an aperture defined near the edge thereof and said illuminating means illuminates one side of said disk so as to shine through said aperture.

3. A time comparison device as recited in claim 2 wherein there is provided a stationary ring having indexing markings thereon surrounding said disk.

4. A time comparison device as recited in claim 1 wherein means is provided to indicate the displacement of said member from a norm each time it is illuminated by one of said pulses of light.

5. A timing system comprising means to generate a multi-phase alternating current supply, a self synchronous repeater having a plurality of stator windings and a rotor winding, circuit means for applying a separate phase of said alternating current supply to each of said stator windings, a timing mechanism for keeping track of time in response to an applied frequency, and circuit means to apply the signal induced in said rotor winding to said timing mechanism.

6. An apparatus for maintaining synchronism between a first time system and a standard time system comprising means to generate a multi-phase alternating current signal, a self-synchronous repeater having a plurality of stator windings and a rotor winding, circuit means for applying a separate phase of said alternating current signal to each of said stator windings, a rotatable indicating member, means to rotate said member in synchronism with the signal induced on said rotor winding, and means to illuminate at least part of said member with pulses of light at a time rate in synchronism with said standard time system.

7. Means for comparing a first time signal with the standard radio time tick comprising a rotatable indicating member, means to rotate said member in synchronism with said first time signal only, means to illuminate at least part of said member with pulses of light in synchronism with said standard radio time tick thereby to present a visual indication of the relationship between said first time signal and said radio time tick, and means for variably changing the visually indicated relationship between said first time signal and said radio time tick.

8. A timing system comprising means to generate a multi-phase alternating current supply, a self-synchronous repeater having a plurality of stator windings and a rotor winding, circuit means for applying a separate phase of said alternating current supply to each of said stator windings, a timing mechanism for keeping track of time in response to an applied frequency, circuit means to apply the signal induced in said rotor winding to said timing mechanism, and means for variably adjusting the phase relationship between one of said stator windings and said rotor winding.

9. An apparatus for maintaining synchronism between a first time system and a standard time system comprising means to generate a multi-phase alternating current signal, a self-synchronous repeater having a plurality of stator windings and a rotor winding, circuit means for applying a separate phase of said alternating current signal to each of said stator windings, a rotatable indicating member, means to rotate said member in synchronism with the signal induced on said rotor winding, means to illuminate at least part of said member with pulses of light at a time rate in synchronism with said standard time system, and means for variably adjusting the phase relationship between one of said stator windings and said rotor winding.

References Cited in the file of this patent

UNITED STATES PATENTS

| | | |
|---|---|---|
| 1,936,683 | Morrison | Nov. 28, 1933 |
| 2,114,714 | Kalsey | Apr. 19, 1938 |
| 2,724,969 | Bloser | Nov. 29, 1955 |